United States Patent
Hubert et al.

(10) Patent No.: US 10,422,384 B2
(45) Date of Patent: Sep. 24, 2019

(54) ELECTRICAL INSULATING DEVICE FOR BEARINGS

(71) Applicant: Aktiebolaget SKF, Göteborg (SE)

(72) Inventors: Mathieu Hubert, Ann Arbor, MI (US); Igor Dorrestijn, Woerden (NL); Karl Preis, Traun (AT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/880,277

(22) Filed: Jan. 25, 2018

(65) Prior Publication Data

US 2019/0226526 A1    Jul. 25, 2019

(51) Int. Cl.
*F16C 33/62*    (2006.01)
*F16C 41/00*    (2006.01)
*F16C 19/16*    (2006.01)

(52) U.S. Cl.
CPC .............. *F16C 33/62* (2013.01); *F16C 19/16* (2013.01); *F16C 41/002* (2013.01); *F16C 2223/30* (2013.01)

(58) Field of Classification Search
CPC .......... F16C 19/16; F16C 19/52; F16C 33/62; F16C 41/002; F16C 2202/32; F16C 2223/30
USPC ........................................................ 384/476
See application file for complete search history.

(56) References Cited

U.S. PATENT DOCUMENTS

| | | | | |
|---|---|---|---|---|
| 7,097,362 B2* | 8/2006 | Inukai | .................. | C23C 4/02 384/476 |
| 7,503,697 B2* | 3/2009 | Tsuji | .................. | F16C 19/52 384/476 |
| 8,172,463 B2* | 5/2012 | Nakajima | .............. | F16C 33/64 29/898.12 |
| 9,206,841 B2* | 12/2015 | Cordier | ................ | F16C 19/163 |

FOREIGN PATENT DOCUMENTS

DE    10137785    *    2/2003

* cited by examiner

*Primary Examiner* — James Pilkington
(74) *Attorney, Agent, or Firm* — Mark Ussai; SKF USA Inc. Patent Dept.

(57) ABSTRACT

An insulating device is for a bearing mountable within a housing and includes a generally annular metallic body configured to couple with an outer ring of the bearing so as to be mounted to the bearing when the bearing is separate from a housing. The body includes an axial portion, the axial portion having an inner circumferential surface disposable about the outer ring outer surface and an opposing outer circumferential surface, and first and second radial portions each disposable against a separate one of the outer ring axial ends. At least one oxide layer is formed on at least one of the inner and outer circumferential surfaces of the body axial portion so as to substantially prevent electrical flow between the bearing and the housing.

8 Claims, 12 Drawing Sheets

ELECTRICAL INSULATING DEVICE FOR BEARINGS

BACKGROUND OF THE INVENTION

The present invention relates to bearings, and more particularly to bearings for use in electrical equipment such as motors and generators.

Bearing assemblies are well known and typically include inner and outer races and rolling elements between the races, or inner and outer members having relatively slidable surfaces. In either case, damage can occur to the bearing components when electric current passes through the bearing. To prevent such flow of current, bearing rings have been provided with insulative coatings or the bearings have been provided with rolling elements formed of a non-conductive material, such as ceramic.

SUMMARY OF THE INVENTION

In one aspect, the present invention is an insulating device for a bearing mountable within a housing, the bearing having inner and outer rings and a plurality of rolling elements disposed between the rings, the outer ring having an outer circumferential surface and opposing axial ends. The insulating device comprises a generally annular metallic body configured to couple with the outer ring so as to be mounted to the bearing when the bearing is separate from a housing. The body includes an axial portion, the axial portion having an inner circumferential surface disposable about the outer ring outer surface and an opposing outer circumferential surface, and first and second radial portions each disposable against a separate one of the outer ring axial ends. At least one oxide layer is formed on at least one of the inner and outer circumferential surfaces of the body axial portion so as to substantially prevent electrical flow between the bearing and the housing.

In another aspect, the present invention is an insulated bearing assembly mountable about a shaft and within a housing, the shaft or the housing being rotatable about a central axis. The bearing assembly comprises a bearing including inner and outer rings and a plurality of rolling elements disposed between the two rings, the inner ring being mountable upon the shaft, the outer ring having an outer circumferential surface and opposing axial ends. An insulating device includes a generally annular metallic body configured to couple with the outer ring so as to be mounted to the bearing when the bearing is separate from a housing. The body includes an axial portion, the axial portion having an inner circumferential surface disposable about the outer ring outer surface and an opposing outer circumferential surface, and first and second radial portions each disposable against a separate one of the outer ring axial ends. Further, at least one oxide layer is formed on at least one of the inner and outer circumferential surfaces of the body axial portion so as to substantially prevent electrical flow between the bearing and the housing.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-13 an insulating device 10 for a bearing 12 mountable within a housing 1 and about a shaft 2, the housing 1 or the shaft 2 being rotatable about a central axis $A_C$. The bearing 12 has inner and outer rings 14, 16, respectively, and a plurality of rolling elements 18 (e.g., balls, cylinders, etc.) disposed between the rings 14, 16. The outer ring 16 has an outer circumferential surface 17 and opposing axial ends 16a, 16b each having a generally radially-extending surface 19A, 19B, respectively. The insulating device 10 basically comprises a generally annular metallic body 20 configured to couple with the bearing outer ring 16, so as to be mounted to the bearing 12 when the bearing 12 is separate from a housing 1, and at least one oxide layer 22 formed on a surface of the body 20 so as to substantially prevent electrical flow between the bearing 12 and the housing 1. As such, the insulating device 10 and the bearing 12 form an electrically insulated bearing assembly 11 that substantially prevents electric flow through the bearing 12 (e.g., between a shaft 2 and the housing 1) while enabling heat to be conducted from the shaft 2 to the housing 1, or vice-versa.

Figure 10:
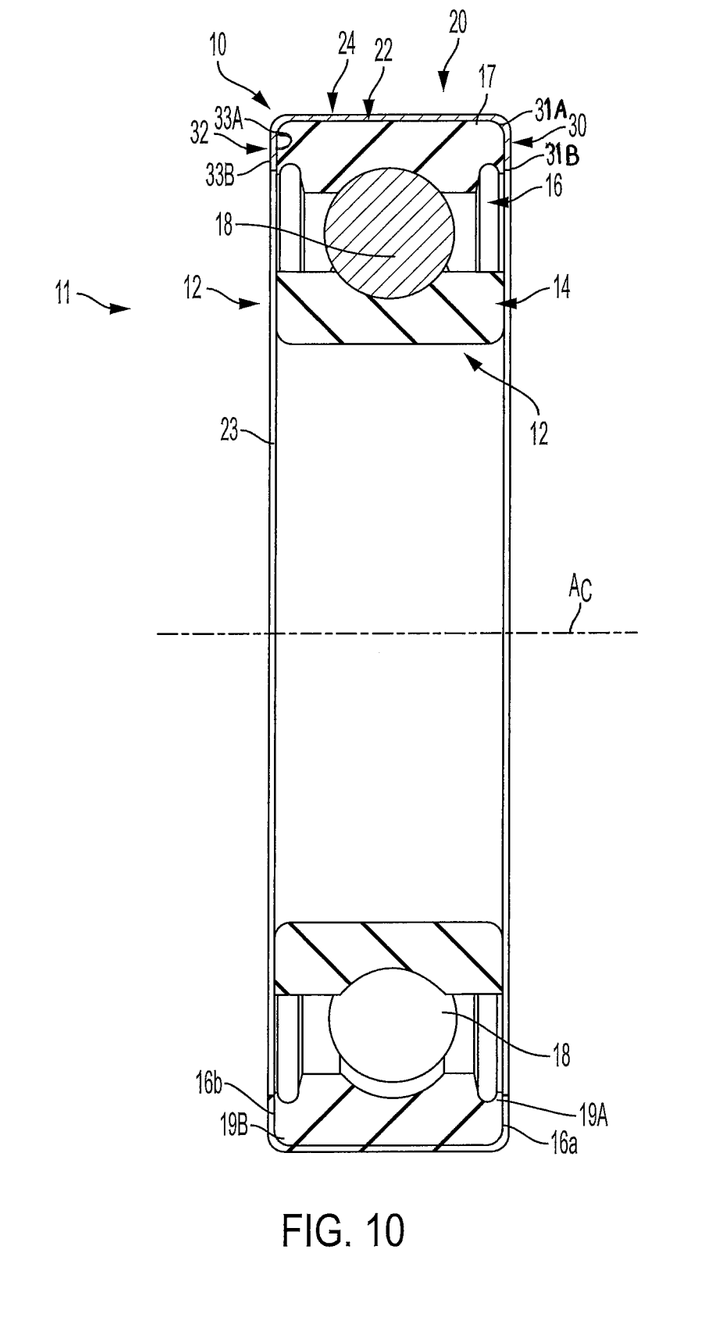
FIG. 10 is an axial cross-sectional view of the second construction insulating device.
Figure 11:
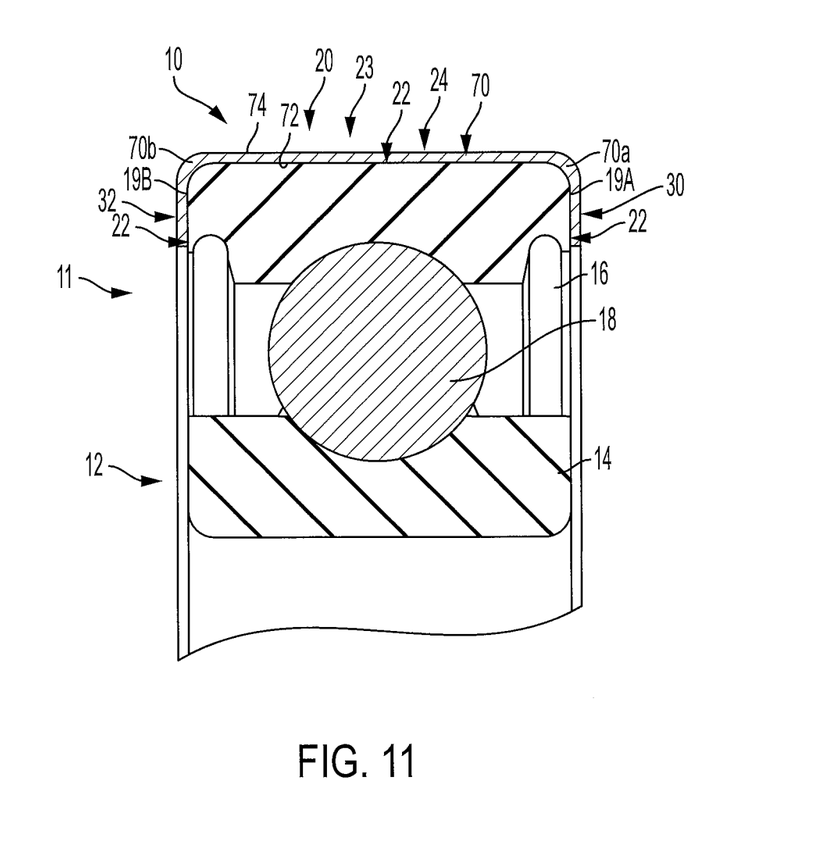
FIG. 11 is an enlarged, broken-away view of the upper portion of FIG. 10.
Figure 12:
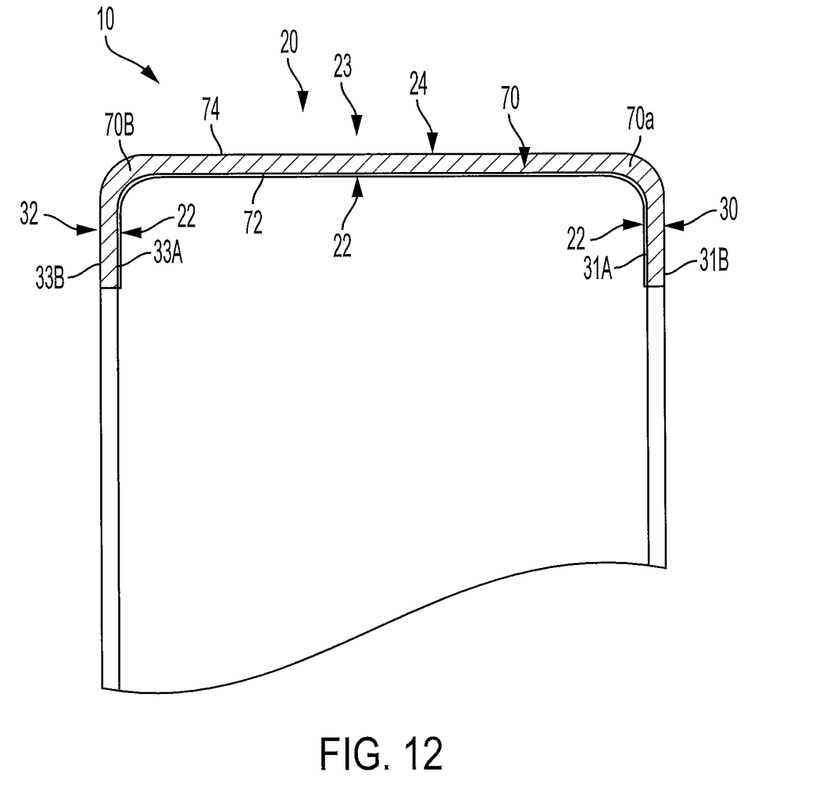
FIG. 12 is an enlarged, broken-away view of an upper portion of the second construction insulating device.

More specifically, the metallic body 20 is preferably relatively "thin-walled" and includes an axial portion 24 having an inner circumferential surface 26 disposable about the outer ring outer surface 17 and an opposing outer circumferential surface 28. The axial portion outer surface 28 is disposable against an inner circumferential surface 3 of the housing 1 or a component (e.g., a bushing, a sleeve, housing component, etc.) disposed within the housing 1 when the bearing 12 is installed therein. The body 20 also includes first and second radial portions 30, 32, respectively, each disposable against a separate one of the outer ring axial ends 16a, 16b, respectively. As indicated in FIGS. 3 and 10, each radial portion 30, 32 has an inner radial surface 31A, 33A, respectively, and an outer radial surface 31B, 33B, respectively, with each radial portion inner surface 31A, 33A being disposed against a radial surface 19A, 19B of the bearing outer ring 16.

Further, the one or more oxide layers 22 is/are formed on at least one of the inner and outer circumferential surfaces 26, 28, respectively, of the body axial portion 24, and may also be formed on at least one or both radial surface 31A, 31B of the body radial portions 30, 32, as discussed below. The oxide layer(s) 22 are formed from oxidation of the material of the body 20 by an appropriate process, as discussed in further detail below, and thus consist of an oxidized form of the material of the body 20 (e.g., aluminum oxide). Preferably, the metallic body 20 is formed of aluminum or an aluminum alloy, but may alternatively be formed of nickel, cobalt, titanium, zinc, stainless steel, an alloy of any of the previously listed materials, or, although not preferred, low carbon steel, or any other appropriate metallic materials.

Furthermore, the oxide layer(s) 22 are preferably formed by anodization and consist of aluminum oxide, but may be formed of an oxide of any of the previously listed materials. Additionally, certain oxide layers 22 may require a special coating or sealant layer to prevent flaking or other damage to the layer(s) 22, which may be formed of materials such as polytetrafluorethylene, nickel acetate, cobalt acetate, etc. Also, the one or more oxide layers 22 may alternatively be formed by any other appropriate technique for forming an oxide layer on a metallic body, which depends on the specific body material.

Figure 3:
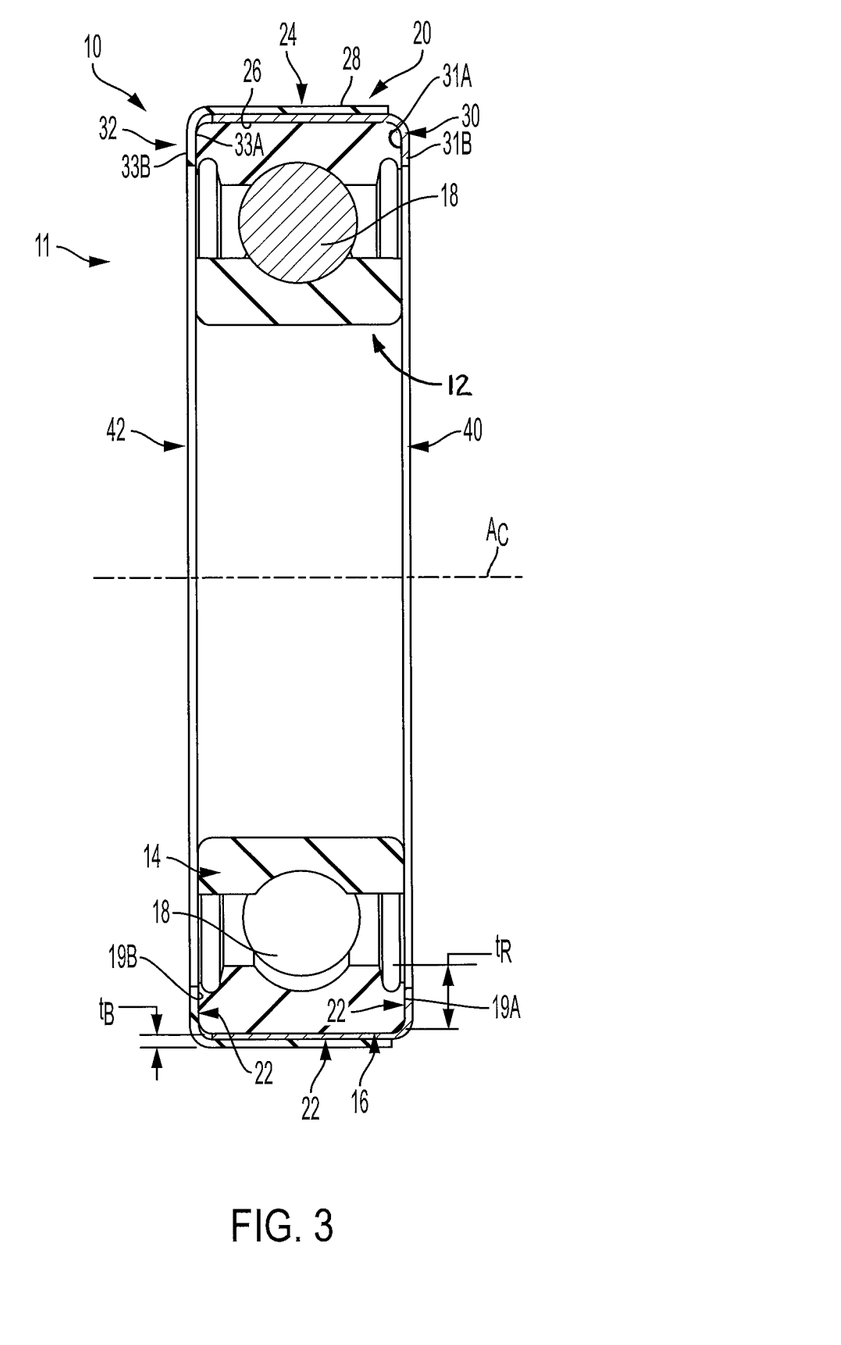
FIG. 3 is an axial cross-sectional view of the first construction insulating device.
Figure 4:
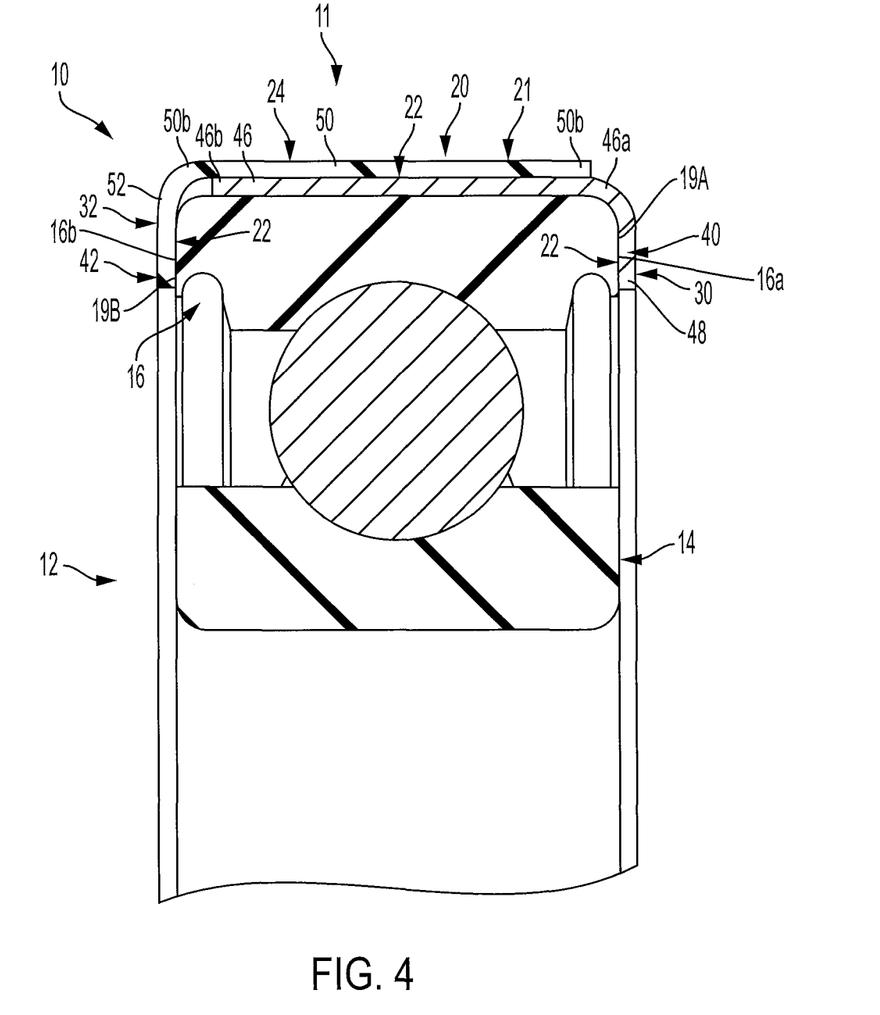
FIG. 4 is an enlarged, broken-away view of the upper portion of FIG. 3.

Referring particularly to FIG. 3, the metallic body 12 is preferably generally thin-walled and sized such that the space requirements for installing the insulated bearing assembly 11 in the housing 1 are not substantially increased in comparison with a conventional, non-insulated bearing. Specifically, the body axial portion 24 has a radial thickness $t_B$ defined between the inner and outer circumferential surfaces 26, which is substantially lesser than a radial thickness $t_R$ of the outer ring 16. Preferably, the body axial portion 24 is sized such that a ratio of the outer ring thickness $t_R$ to the body thickness $t_B$ is at least four (4), but may be less when desired to "fill" a greater available bore space.

Referring now to two FIGS. 2-8, in one preferred construction, the metallic body 20 is formed as an assembly 21 of at least two body segments, specifically at least a first body segment 42 and a second body segment 44 coupled together to form the metallic body 20. The first body segment 42 has a generally tubular axial section 46 with opposing first and second axial ends 46a, 46b and inner and outer circumferential surfaces 47A, 47B, and a generally annular, generally plate-like radial section 48 providing the body first radial portion 30. The first segment axial section 46 has an outside diameter $OD_F$ and is disposable about the bearing ring outer surface 17 to couple the first segment 42 with the outer ring 16. Further, the first segment radial section 48 extends radially inwardly from the first end 46a of the tubular axial section 46 and is disposable against one of the bearing outer ring axial ends 16a or 16b.

Furthermore, the second body segment 44 has a generally tubular axial section 50 with opposing axial ends 50a, 50b and inner and outer circumferential surfaces 51A, 51B, and a generally annular, generally plate-like radial section 52 providing the body second radial portion 32. The second segment axial section 50 has an inside diameter IDs, is disposable about the first segment axial section 46 to couple the second segment 44 with the first segment 42, the two segment axial sections 46, 50 forming the body axial portion 24. Also, the second segment radial section 52 extends radially inwardly from the second end 50b of the tubular axial section 50 and is disposable against the other one of the outer ring axial ends 16b, 16a. Furthermore, although depicted and described herein as being formed of two body segments 42, 44, the body assembly 21 may alternatively be formed of three or more body segments (not shown), with at least two of such segments providing the body first and second radial portions 30, 32.

Figure 6:
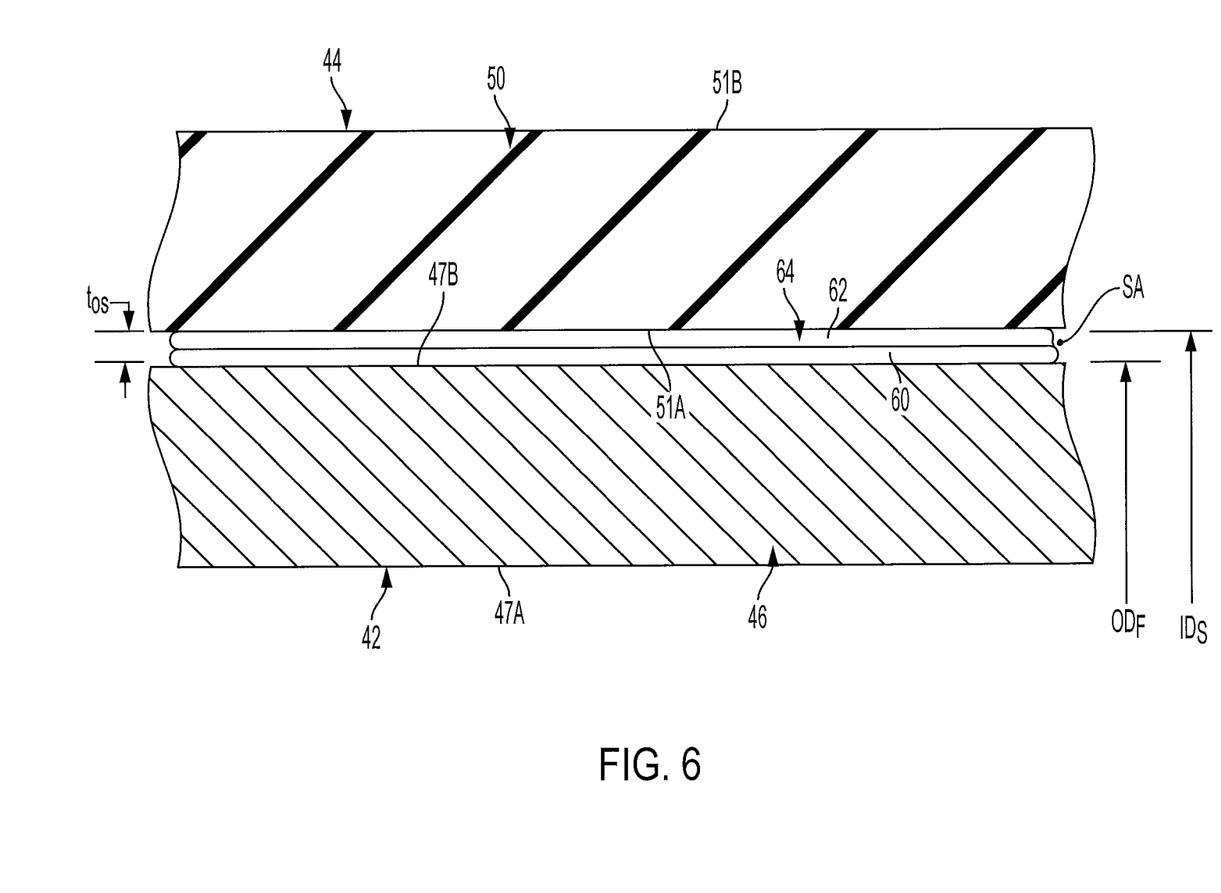
FIG. 6 is a greatly enlarged, broken away view of a portion of the first construction insulating device, showing an exaggerated view of the spacing between first and second segments and an oxide layer stack.

As best shown in FIG. 6, with the two-piece body construction, the at least one oxide layer 22 is formed at least on the outer circumferential surface 47B of the first segment axial section 46 or/and on the inner circumferential surface 51A of the second body segment axial section 50. Preferably, the at least one oxide layer 22 includes a first oxide layer 60 formed on the first segment outer circumferential surface 47B and a second oxide layer 62 formed on the second segment inner circumferential surface 51A. The first and second body segments 42, 44 are sized such that the first oxide layer 60 engages the second oxide layer 62 with an interference fit, which is preferably a light or locational fit. More specifically, the two body segments 42, 44 are sized such that a difference between the second segment inside diameter IDs and the first segment outside diameter $OD_F$ is within a range of about fifty micrometers (50 μm) and about two hundred fifty micrometers (250 μm).

With this relatively sizing, the preferred first and second oxide layers 60, 62 collectively form an oxide stack 64 that occupies the annular space SA (FIG. 6) between the body axial portions 46, 50. In other words, each layer 60, 62 preferably has a thickness (not indicated) of between about twenty-five micrometers (25 μm) and about one hundred twenty-five micrometers (125 μm). The oxide stack 56 has a radial thickness $t_{OS}$ that is substantially greater than is achievable as a single layer formed by conventional oxidation techniques, such as anodization, etc. However, it must be noted that the body segments 42, 44 are initially sized to be generally "in contact" or with minimal spacing before formation of the oxide layers 60, 62, such that the desired axial stack thickness $t_{OS}$ results after the material of the body 20 is oxidized.

Further, by forming the layers 60, 62 on the surfaces 47B, 51A of each segment 42, 44, respectively, and then assembling the segments 42, 44 together to form the body 20, the two preferred oxide layers 22 are encapsulated by the body segments 42, 44. Thereby, the oxide layer(s) 60, 62 are protected from damage (e.g., scratches, abrasions, etc.) that could occur during installation of the bearing assembly 11, such as during press-fitting within the bore surface 3, or/and during handling of the assembly 11 prior to installation. Such damage may create an electrical conduction path through the bearing assembly 11. However, the one or more oxide layers 22 may alternatively be formed on the first segment inner surface 47A, the second segment outer surface 51B, or/and on only one of the engaged segments surfaces 47B or 51A.

Figure 1:
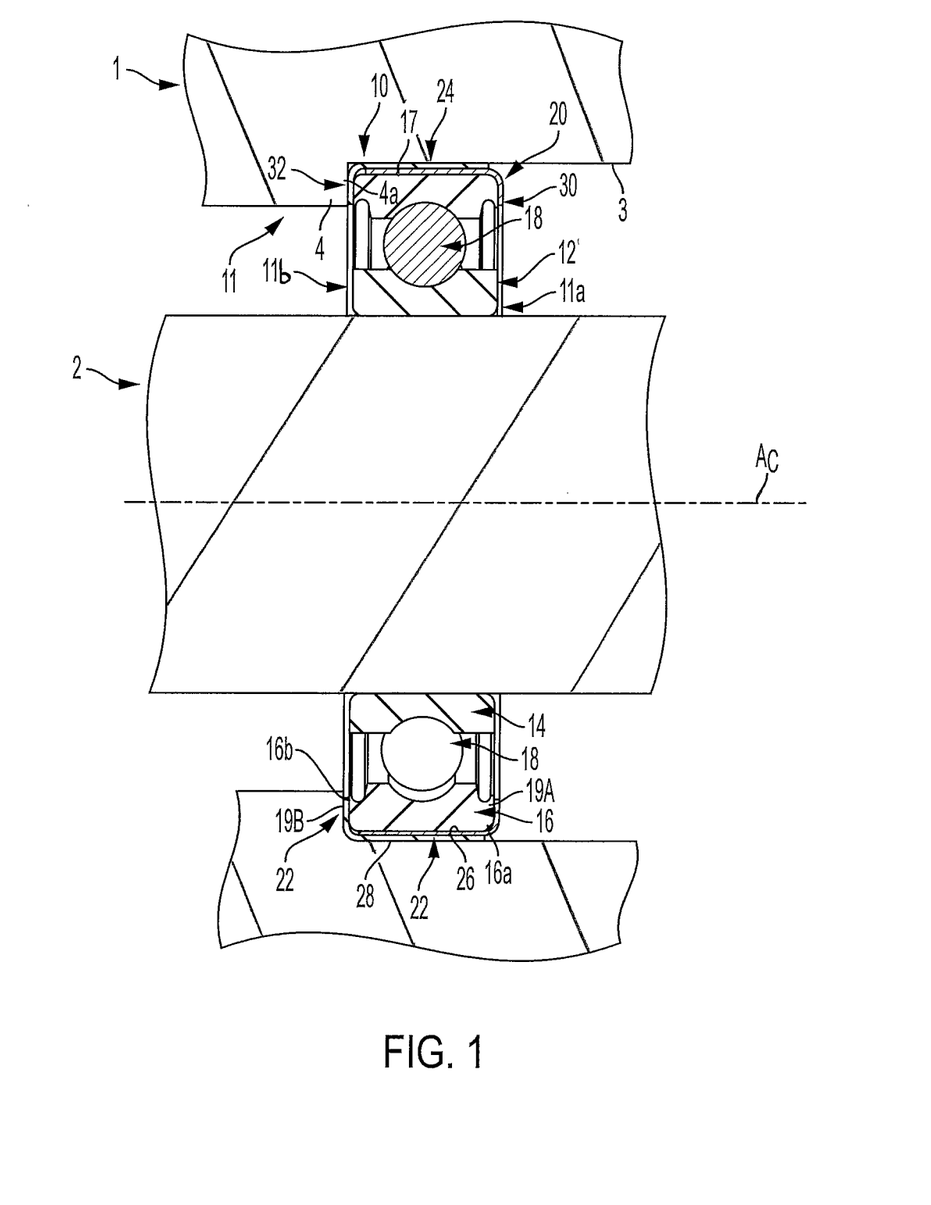
FIG. 1 is an axial cross-sectional view of an insulated bearing assembly including an insulating device in accordance with a first construction of the present invention, shown mounted between a shaft and housing.
Figure 2:
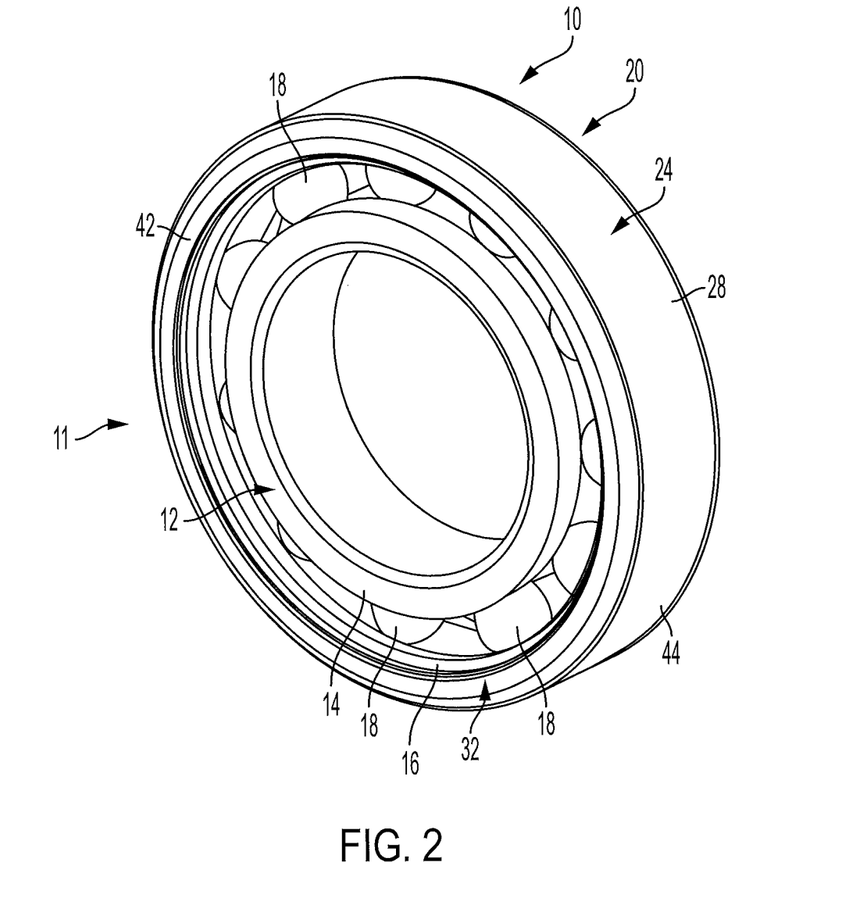
FIG. 2 is a perspective view of the insulated bearing assembly with the first construction insulating device.
Figure 5:
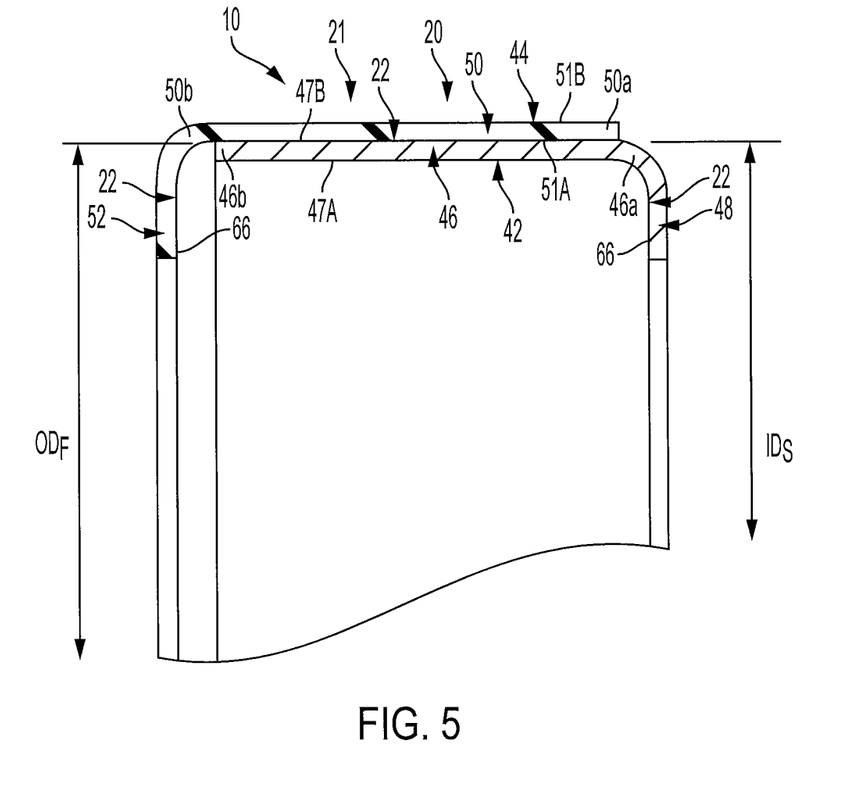
FIG. 5 is an enlarged, broken-away view of an upper portion of the first construction insulating device.

Furthermore, in certain applications as shown in FIG. 1, the axial sides 11a, 11b of the insulated bearing assembly 11 are intended to contact a radial surface 4a of the housing 1, such as provided by a shoulder 4 (FIG. 1) of a housing counterbore, or a component disposed within the housing 1 (e.g., a collar, nut, seal, etc.—none shown). In such applications, a radial oxide layer 66 is preferably formed on least one of the first and second segment radial sections 48, 52, respectively, to prevent electrical conduction through the radial portion 30 or 32 in contact with the housing 1, as best shown in FIG. 5. Preferably, the one or more radial oxide layers 66 are each formed on the inner surface 31A, 33A of the segment radial section 48 and/or 52, i.e., the surface in contact with the outer ring axial end 16a or 16b, to prevent damage to the layer(s) 66 during handling and installation of the bearing assembly 11. However, the radial oxide layer(s) 66 may be formed on the outer surface 31B, 33B of each segment radial section 48, 52, either alternatively to or in addition to the layer(s) 66 on the inner surface(s) of the segment radial sections 48, 52.

Figure 7:
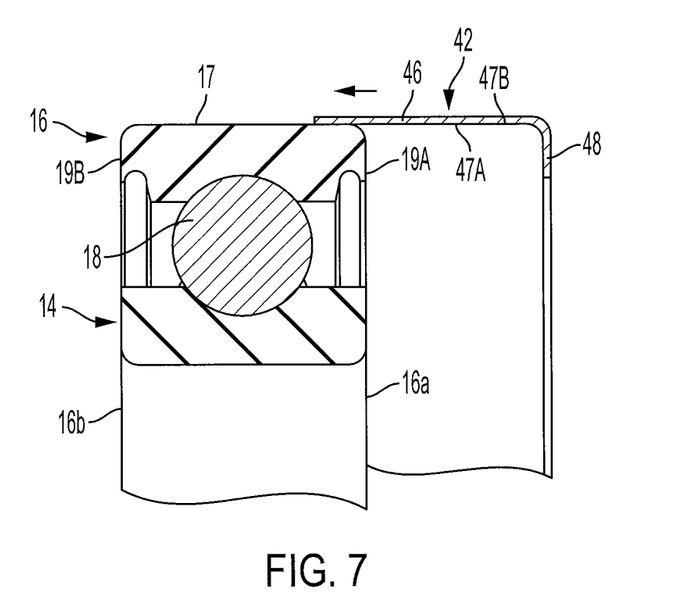
FIG. 7 is a broken-away, enlarged view of an upper portion of a bearing and a first segment of the insulating device, depicting the installation of the segment about the bearing.
Figure 8:
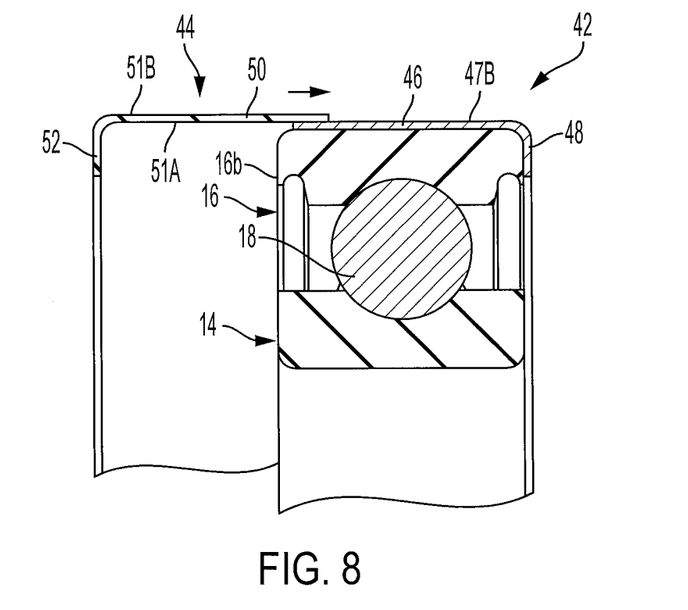
FIG. 8 is broken-away, enlarged view of the upper portion of the bearing, the insulating device first segment and a second segment of the insulating device, depicting the installation of the second segment about the first segment.
Figure 9:
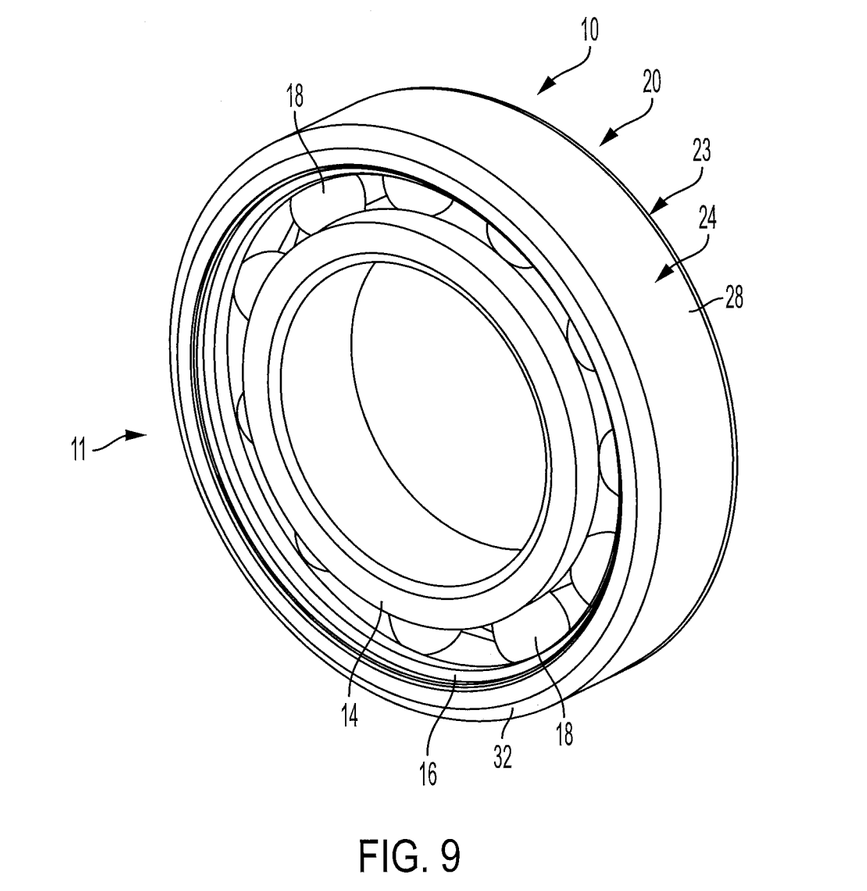
FIG. 9 is a perspective view of an insulated bearing assembly with a second construction insulating device.

Referring to FIGS. 7 and 8, to mount the insulative device 10 to the bearing 12, the first body segment 42 is installed about the outer ring 16 by sliding the first segment axial portion 46 over the bearing outer surface 17 until the first segment radial section 48 is located against the outer ring first axial end 16a. The first segment 42 is preferably retained on the outer ring 16 by friction between the bearing ring outer surface 17 and either the segment axial portion inner surface 47A or an oxide layer (not shown) formed on the inner surface 47A. Then, the second segment 44 is installed on the first segment 42 by sliding the axial portion 50 of the second segment 44 over the axial section 46 of the first segment 42 until the second segment radial section 52 is located against the outer ring second axial end 16b. Similarly with the first segment 42 about the ring 16, the outer, second segment 44 is preferably retained about the inner, first segment 42 by frictional engagement, preferably between the first and second oxide layers 60, 62 but alternatively between the two segment surfaces 47B, 51A or one layer 60 or 62 on one segment 42, 44 and the contacting surface 51A, 47B of the other segment 44, 42.

Referring now to FIGS. 9-13, in another preferred construction, the metallic body 20 is a one-piece body 23 having only a single axial portion 70 (i.e., not formed of overlapping sections) with opposing axial ends 70a, 70b and inner and outer circumferential surfaces 72, 74, respectively. Each one of the first and second radial portions 30, 32 is integrally formed with a separate one of the axial portion ends 70a, 70b, respectively. With such a structure, at least one of the body first and second radial portions 30 or 32 is configured to bend about the integrally connected end 70a, 70b of the axial portion 70, so as to be disposed against one radial surface 19A or 19B of the outer ring 16, to couple the body 20 with the bearing 12.

Figure 13:
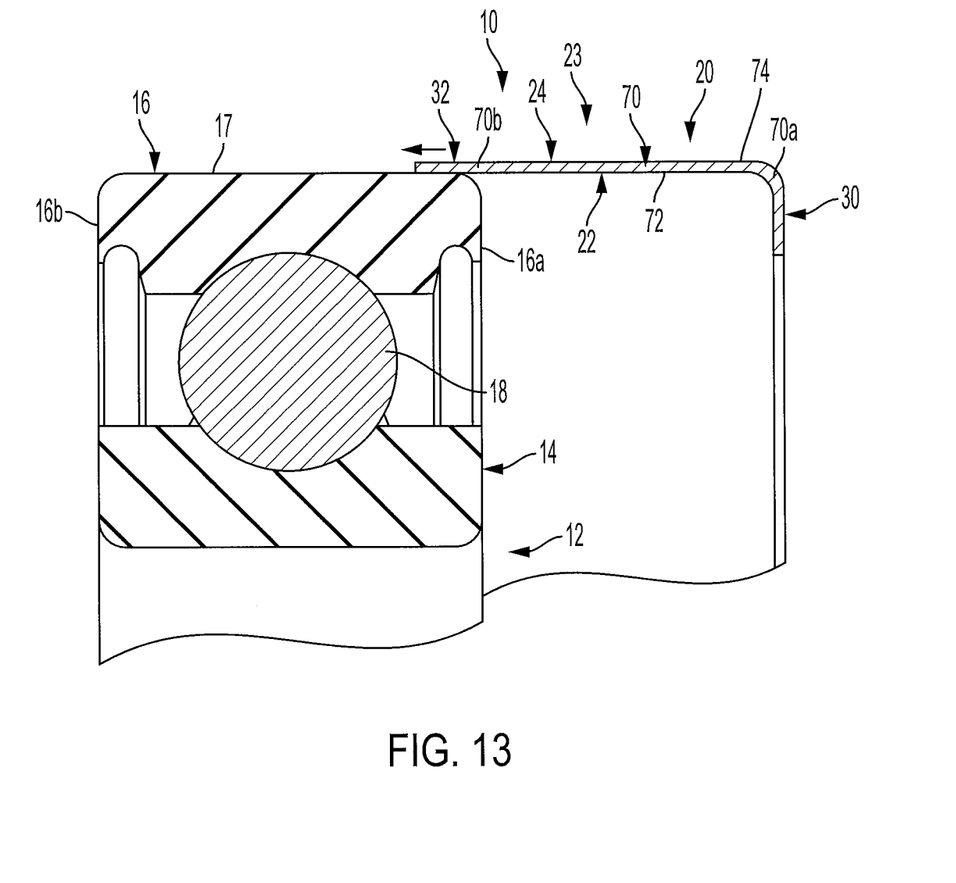
FIG. 13 is a broken-away, enlarged view of an upper portion of a bearing and the second construction insulating device, depicting the installation of the device about the bearing.

In other words, at least one of the body radial portions 30, 32 is generally co-planar with the central axial portion 70 before the metallic body 20 is installed on the outer ring 16, as shown in FIG. 13. To mount the body 20 to the bearing 12, the co-planar radial portion 30 or 32 is slided over the outer ring outer surface 17 until the body axial portion 70 is disposed about the outer ring 16. Then, one or both radial portions 30, 32 is/are bended about the integrally connected end 70a, 70b of the axial portion 70 until each radial portion 30, 32 is disposed against a proximal one of the ring axial ends 16a, 16b, respectively.

In the one-piece body construction, the at least one oxide layer 22 is preferably formed on the inner circumferential surface 72 of the axial portion 70, and preferably also on the inner radial surfaces 31A, 33A of the radial portions 30, 32, prior to mounting the body 20 on the bearing 12 and bending one or both radial portions 30, 32 against one of the outer ring axial ends 16a, 16b. As such, the oxide layer 22 is protected from damage (e.g., scratches, etc.) during handling or installation of the bearing assembly 11. However, the one-piece body 23 may alternatively have an oxide layer 22 on both axial portion circumferential surfaces 72, 74, on only the outer surface 74, or/and on the inner or outer radial surface 31A, 33A or 31B, 33B of either or both of the body radial portions 30, 32.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. An insulating device for a bearing mountable within a housing, the bearing having an inner ring, an outer ring and a plurality of rolling elements disposed between the rings, the outer ring having an outer circumferential surface and opposing axial ends, the insulating device comprising:

a generally annular metallic body configured to couple with the outer ring so as to be mounted to the bearing, the body including a first body segment having a generally tubular axial section with opposing first and second axial ends and inner and outer circumferential surfaces, the axial section of the first body segment being disposable about the outer circumferential surface of the outer ring to couple the first body segment with the outer ring, and a generally annular radial section providing a first radial portion of the body, the radial section of the first body segment extending radially inwardly from the first end of the tubular axial section and being disposable against one of the axial ends of the outer ring, and a second body segment having a generally tubular axial section with opposing first and second axial ends and inner and outer circumferential surfaces, the axial section of the second body segment being disposable about the axial section of the first body segment to couple the second body segment with the first body segment, the axial portion of the first body segment and the axial portion of the second body segment forming a body axial portion, and a generally annular radial section providing a second radial portion of the body, the radial section of the second body segment extending radially inwardly from the second end of the axial section of the second body segment and being disposable against the other one of the axial ends of the outer ring; and a first oxide layer formed on the outer circumferential surface of the first body segment and a second oxide layer formed on the inner circumferential surface of the second body segment, the first and second body segments being sized such that the first oxide layer engages the second oxide layer with an interference fit, the first and second oxide layers substantially preventing electrical flow between the bearing and the housing.

2. The insulating device as recited in claim 1 wherein the body axial portion has a radial thickness defined between the inner circumferential surface of the axial portion of the first body segment and the outer circumferential surface of the axial portion of the second body segment, the radial thickness of the body axial portion being substantially lesser than a radial thickness of the outer ring such that a ratio of the radial thickness of the outer ring to the radial thickness of the body axial portion is at least four (4).

3. The insulating device as recited in claim 1 wherein the axial section of the first body segment has an outside diameter and the axial section of the second body segment has an inside diameter, a difference between the inside diameter of the second body segment and the outside diameter of the first body segment being within a range of about fifty micrometers (50 μm) and about two hundred fifty micrometers (250 μm).

4. The insulating device as recited in claim 1 wherein each one of the first and second radial portions has opposing radial surfaces and at least one of the radial portions includes an oxide layer formed on one of the radial surfaces.

5. The insulating device as recited in claim 1 wherein the body is formed of one of aluminum, an aluminum alloy, nickel, a nickel alloy, cobalt, a cobalt alloy, titanium, a titanium alloy, zinc, a zinc alloy and stainless steel.

6. An insulated bearing assembly mountable about a shaft and within a housing, the shaft or the housing being rotatable about a central axis, the bearing assembly comprising:

a bearing including an inner ring, an outer ring and a plurality of rolling elements disposed between the inner and outer rings, the inner ring being mountable upon the shaft, the outer ring having an outer circumferential surface and opposing axial ends; and an insulating device including a generally annular metallic body configured to couple with the outer ring so as to be mounted to the bearing, the body including an axial portion, the axial portion having an inner circumferential surface disposable about the outer circumferential surface of the outer ring and an opposing outer circumferential surface, and a first radial portion and a second radial portion each disposable against a separate one of the axial ends of the outer ring; and at least one oxide layer formed on at least one of the inner and outer circumferential surfaces of the axial portion of the body so as to substantially prevent electrical flow between the bearing and the housing;

wherein the body includes a first body segment having a generally tubular axial section with opposing first and second axial ends and inner and outer circumferential surfaces, the axial section of the first body segment being disposable about the outer circumferential surface of the outer ring to couple the first body segment with the outer ring, and a generally annular radial section providing the first radial portion of the body, the radial section of the first body segment extending radially inwardly from the first end of the tubular axial section and being disposable against one of the axial ends of the outer ring, and a second body segment having a generally tubular axial section with opposing first and second axial ends and inner and outer circumferential surfaces, the axial section of the second body segment being disposable about the axial section of the first body segment to couple the second body segment with the first body segment, the axial section of the first body segment and the axial section of the second body segment forming the axial portion of the body, and a generally annular radial section providing the second radial portion of the body, the radial section of the second body segment extending radially inwardly from the second end of the axial section of the second body segment and being disposable against the other one of the axial ends of the outer ring; and wherein the at least one oxide layer includes a first oxide layer formed on the outer circumferential surface of the first body segment and a second oxide layer formed on the inner circumferential surface of the second body segment, the first and second body segments being sized such that the first oxide layer engages the second oxide layer with an interference fit.

7. The insulating device as recited in claim 6 wherein the axial section of the first body segment has an outside diameter and the axial section of the second body segment has an inside diameter, a difference between the inside diameter of the second body segment and the outside diameter of the first body segment being within a range of about one hundred seventy-five (175 μm) micrometers and about two hundred twenty-five micrometers (225 μm).

8. The insulating device as recited in claim 6 wherein each one of the first and second radial portions has opposing radial surfaces and at least one of the radial portions includes an oxide layer formed on one of the radial surfaces.

* * * * *